(12) United States Patent
Wang et al.

(10) Patent No.: US 10,446,300 B2
(45) Date of Patent: Oct. 15, 2019

(54) ANTI-SURGE STRUCTURE BUILT IN SWITCHES

(71) Applicants: Yi-Hsiang Wang, Taoyuan (TW); I-Ying Wang, Taoyuan (TW)

(72) Inventors: Yi-Hsiang Wang, Taoyuan (TW); I-Ying Wang, Taoyuan (TW)

(*) Notice: Subject to any disclaimer, the term of this patent is extended or adjusted under 35 U.S.C. 154(b) by 262 days.

(21) Appl. No.: 15/682,714

(22) Filed: Aug. 22, 2017

(65) Prior Publication Data

US 2019/0066887 A1 Feb. 28, 2019

(51) Int. Cl.
*H02H 1/00* (2006.01)
*H01C 7/12* (2006.01)
*H01C 10/36* (2006.01)
*H02H 9/04* (2006.01)

(52) U.S. Cl.
CPC ............ *H01C 7/12* (2013.01); *H01C 7/126* (2013.01); *H01C 10/36* (2013.01); *H02H 9/041* (2013.01)

(58) Field of Classification Search
USPC .................................. 361/103, 105, 106, 127
See application file for complete search history.

(56) References Cited

U.S. PATENT DOCUMENTS

| | | | | |
|---|---|---|---|---|
| 3,745,505 A * | 7/1973 | Turnbull | ................. | H01L 25/03 338/20 |
| 4,345,233 A * | 8/1982 | Matthies | ................. | H01H 23/00 307/141 |
| 7,688,174 B2 * | 3/2010 | Hung | ................... | H01H 23/025 337/56 |
| 8,378,778 B2 * | 2/2013 | Duval | ................... | H01C 7/126 338/20 |
| 8,643,462 B2 * | 2/2014 | Lee | ........................ | H01H 71/18 200/332 |
| 2011/0109421 A1 * | 5/2011 | Lee | ........................ | H01H 9/0271 337/112 |
| 2012/0067708 A1 * | 3/2012 | Lee | ........................ | H01H 71/18 200/293 |
| 2016/0006235 A1 * | 1/2016 | Wang | ...................... | H02H 3/38 361/91.2 |
| 2016/0233041 A1 * | 8/2016 | Wang | ...................... | H01H 61/02 |
| 2017/0047180 A1 * | 2/2017 | Wang | ...................... | H01C 7/12 |
| 2017/0148601 A1 * | 5/2017 | Wang | ...................... | H01H 89/04 |
| 2017/0148602 A1 * | 5/2017 | Wang | ...................... | H01H 37/761 |
| 2019/0066887 A1 * | 2/2019 | Wang | ...................... | H01C 7/12 |

* cited by examiner

*Primary Examiner* — Ronald W Leja
(74) *Attorney, Agent, or Firm* — Rosenberg, Klein & Lee

(57) ABSTRACT

An anti-surge structure built in switches includes three metal-oxide varistors disposed in an insulating body in stair-like arrangement. The metal-oxide varistors further has an insulating band surrounding a middle metal-oxide varistor and defining four isolated insulating areas within the insulating body, so as to avoid high voltage flashover and to protect the structure from external impacts. With the stair-like arrangement, each metal-oxide varistor has a connecting area for both ends of a metal strap to be welded thereon by low-temperature solder paste. When the low-temperature solder paste are melted by heat, a compressed spring element thereof is ejected to displace a pushing element thereof and to further detach two connecting points of the structure, so as to break a circuit connected by the structure.

10 Claims, 14 Drawing Sheets

ANTI-SURGE STRUCTURE BUILT IN SWITCHES

BACKGROUND OF THE INVENTION

1. Field of the Invention

The present invention relates to an anti-surge structure that is built in switches and has a plurality of metal-oxide varistors disposed in stair-like arrangement so that each metal-oxide varistor has a surface area for vertically electrical connection, thereby shortening a height of the entire structure.

2. Description of the Related Art

FIGS. 1A and 1B disclosed an overcurrent protection switch 10, comprising a housing 11 with a press button 12 on a top thereof, a first terminal 12a, a second terminal 12b, a third terminal 12c at a bottom thereof, and a moving element 14. The first terminal 12a has a bimetal plate 13 and a first contact point 131, and the second terminal 12b has a second contact point 121 corresponding to the first contact point 131. The moving element 14 is arranged vertically, linking a bottom of the press button 12 with an end thereof and a moving terminal of the bimetal plate 13 with another end thereof, whereby pressing of the press button 12 actuates the bimetal plate 13, connects the first contact point 131 to the second contact point 121 and therefore connects a circuit within the switch 30; when overcurrent occurs, the bimetal plate 13 deforms due to high degree of temperature and disconnects the first and second contact points 131, 121, breaking the circuit, so as to form an overcurrent protection switch 10. Such structure can be found in Taiwan patent applications No. 540811, 367091, 320335, 262168, and 208384. However, the structure disclosed above aims at protection from overcurrent situation but is not able to protect the device when sudden overvoltage such as lightning strike occurs. Therefore, for safety concern, a usual solution to the defect is to connect a metal-oxide varistor and a thermal fuse to the device.

FIG. 2A is the invention of U.S. Pat. No. 8,643,462. It discloses an anti-surge switch module applied in power supply systems. The switch module comprises a power switch 105, an insulating member 106, a surge absorber 107 and a pyrocondensation belt 108. The insulating member 106 engages with the power switch 105 that is abutting on the surge absorber 107, and the pyrocondensation belt 108 ties the surge absorber 107 and the insulating member 106 together so that it could contract when receiving heat from the surge absorber 107 and thus turn off the power switch 105 by certain degree of contracting. However, the insulating member 106, surge absorber 107 and pyrocondensation belt 108 are not disposed inside the power switch 105 but are connected outside, failing to form a complete device with the power switch 105. In short, such structure has shortcomings of uncertain quality, exceeding heat due to external connection of the components, slow reaction, large volume and complicated composition, and the structure requires more constructing space and procedures. Besides, the protection device has to be connected independently outside instead of having one inside.

In UL 1449 3rd Edition (2009), Type 4 was added to Surge Protective Devices (SPDs) requirements. The 3rd Edition also includes the Low voltage Surge Arresters under 1000V in the requirements, and the title is also altered from Transient Voltage Surge Suppressors into Surge Protective Devices. This shows the importance of integrating the components and the surge arresters function of the device.

Hence, the inventor has an invention in U.S. patent application Ser. No. 14/617,000 filed on Feb. 9, 2015 which has an anti-surge disconnection structure built inside a heat-resisting and fireproof housing of an overcurrent protection switch so that the disconnection could be operated successfully and instantly when an overload occurs. Features of the invention disclosed are illustrated in FIG. 2B. A band 74' has a first end 741' and a second end 742' fixedly adhered on a surface of a metal-oxide varistor 71' by a thermo-sensitive piece 72' in order to tightly compress a spring 73' by wrapping it up. When overvoltage occurs, the metal-oxide varistor 71' is heated and melts down the thermo-sensitive piece 72' instantly, thereby loosening the band 74' for the spring 73' to eject upwards to push a pushing rod 75' and disconnect the circuit. In such structure, either the band 74' or the spring 73' has to be made of insulating materials to prevent from short circuit.

Still, the inventor has continued to develop such feature and further designed a switch module disclosed in U.S. patent application Ser. No. 14/950,069 filed on Nov. 24, 2015. The switch module has the same effect of instant disconnection of the circuit upon encountering overcurrent and overvoltage. The invention also has a built-in structure that can melt down a thereto-sensitive piece by three heated metal-oxide varistors for a spring element to be loosened and that has an outer periphery thereof displacing a pushing rod, so as to detach a first contacting point from a second contacting point, and disconnect the circuit. However, the metal-oxide varistors being disposed separately and parallel would increase a height of the structure and result in poor insulation. On the other hand, metal oxide varistors are prone to operate function less effectively after in use for a period. To overcome such issue, manufacturers usually have a fuse connected to a metal oxide varistor for safety concerns.

The inventor therefore tries to improve such structure with a built-in structure of dual disconnection disclosed in U.S. patent application Ser. No. 15/389,885. The structure has conductive plates disconnecting a series connection and an anti-surge structure disconnecting a parallel connection by insulation elements, thereby achieving a simple structure with dual disconnection function. However, arrangement of the metal-oxide varistors still has the same problem of increased height of the structure and poor insulation.

In previous structure, the metal-oxide varistors do not have exposed areas for connection, and the operation may go unsmooth due to horizontal arrangement of the components. Furthermore, a height of the entire structure cannot be lower and insulation is unstable due to complexity of conductive elements. Hence, it is desirable to construct a structure that retains the advantages and improves the shortcomings of the previous structures.

SUMMARY OF THE INVENTION

A primary objective of the present invention is to provide an anti-surge structure in a stair-like arrangement built in switches that retains a function of over-current protection and further includes a plurality of metal-oxide varistors in stair-like arrangement, so that each metal-oxide varistor has a vertical surface for electrical connection. Thereby the structure has a height thereof shortened and prevents the entire structure from high voltage flashover.

To achieve the objects mentioned above, the present invention comprises a housing; a first metal-oxide varistor, a second metal-oxide varistor, a third metal-oxide varistor, each having a first surface at a side thereof and a second surface at an opposite side thereof, said metal-oxide varistors partially overlapped in stair-like arrangement, the first surface of the first metal-oxide varistor and the second surface of the third metal-oxide varistor being left completely exposed, the second surface of the first metal-oxide varistor partially overlapped with the second surface of the second metal-oxide varistor with a first conductive element disposed in-between for electrical connection, the first surface of the second metal-oxide varistor partially overlapped with the first surface of the third metal-oxide varistor with a second conductive element disposed in-between for electrical connection; an insulating body including a first part and a second part assembled for the metal-oxide varistors to be disposed therein, the first part having a first open section and a third open section and the second part having a second open section and a fourth open section for externally electrical connection of the metal-oxide varistors; an insulating band surrounding a periphery of the second metal-oxide varistor and having a thickness greater than a thickness of the second metal-oxide varistor to fill in spaces between the stair-like metal-oxide varistors and the insulating body, protecting the metal-oxide varistors from external impacts and defining four isolated insulating areas around the metal-oxide varistors; a spring element having a fixed section and a springy free end; a pushing element having a lower section abutting correspondingly on a bimetal plate and an upper surface compressing the spring element under a bottom of the second part of the insulating body for the spring element to be resiliently displaceable; a strap disposed under the pushing element and having a first end passing through the first open section and welded to a connecting area of the first surface of the third metal-oxide varistor by low-temperature solder paste, and a second end passing through the second open section and welded to a connecting area of the first surface of the second metal-oxide varistor, so as to fix a position of the pushing element under the second part of the insulating body; a fourth contact piece engaged with the insulating body with a fixing section at an upper part thereof enhancing the engagement and an extended section at a lower part thereof extending through the rear of the housing, said fourth contact piece further having an elastic section at a top thereof, the elastic section including a free end passing through the third open section of the first part of the insulating body and being welded on the first surface of the first metal-oxide varistors by low-temperature solder paste.

Whereby when an overvoltage occurs, temperature of the second and third metal-oxide varistors rises up instantly to a degree that is higher than a melting point of the low-temperature solder pastes, loosening the strap, releasing the free end of the spring element to displace the pushing element and thereby breaking a electrical circuit thereof; or when an overvoltage occurs, temperature of the first metal-oxide varistor rises up instantly to a degree that is higher than a melting point of the low-temperature solder pastes, releasing the elastic section and thereby breaking a electrical circuit thereof.

With structures disclosed above, the stair-like arrangement enables each metal-oxide varistor to have a vertically conductive surface for easier electrical connection without consuming more space and therefore the loosening of the strap can be easier operated. Also, each pair of connecting surfaces of the metal-oxide varistors has the same electrode for operation. With the strap made of metal and the low-temperature solder pastes, the corresponding contact points within the switch have the same electrodes, so as to achieve a simple structure with a shortened height. Moreover, with the insulating body and the insulating band, the structure is perfectly insulated and fixed in position and the metal-oxide varistors are protected from external impact.

DETAILED DESCRIPTION OF THE PREFERRED EMBODIMENT

Referring to FIGS. 3A-11, in a preferred embodiment, the present invention has an anti-surge structure in stair-like arrangement 70 built in a see-saw switch 30.

Figure 10:
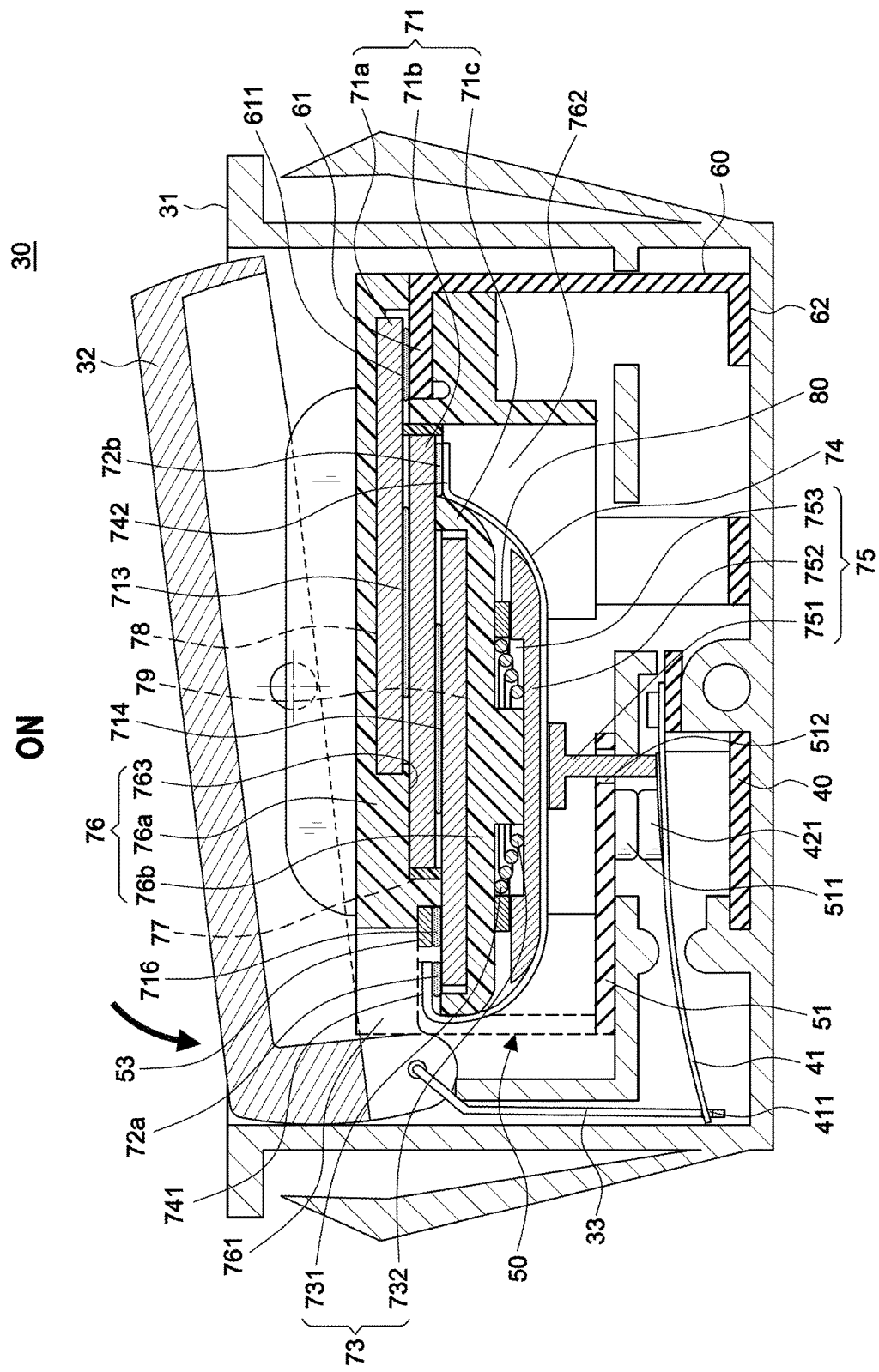
FIG. 10 is a sectional view of the present invention in an ON state in a preferred embodiment.
Figure 11:
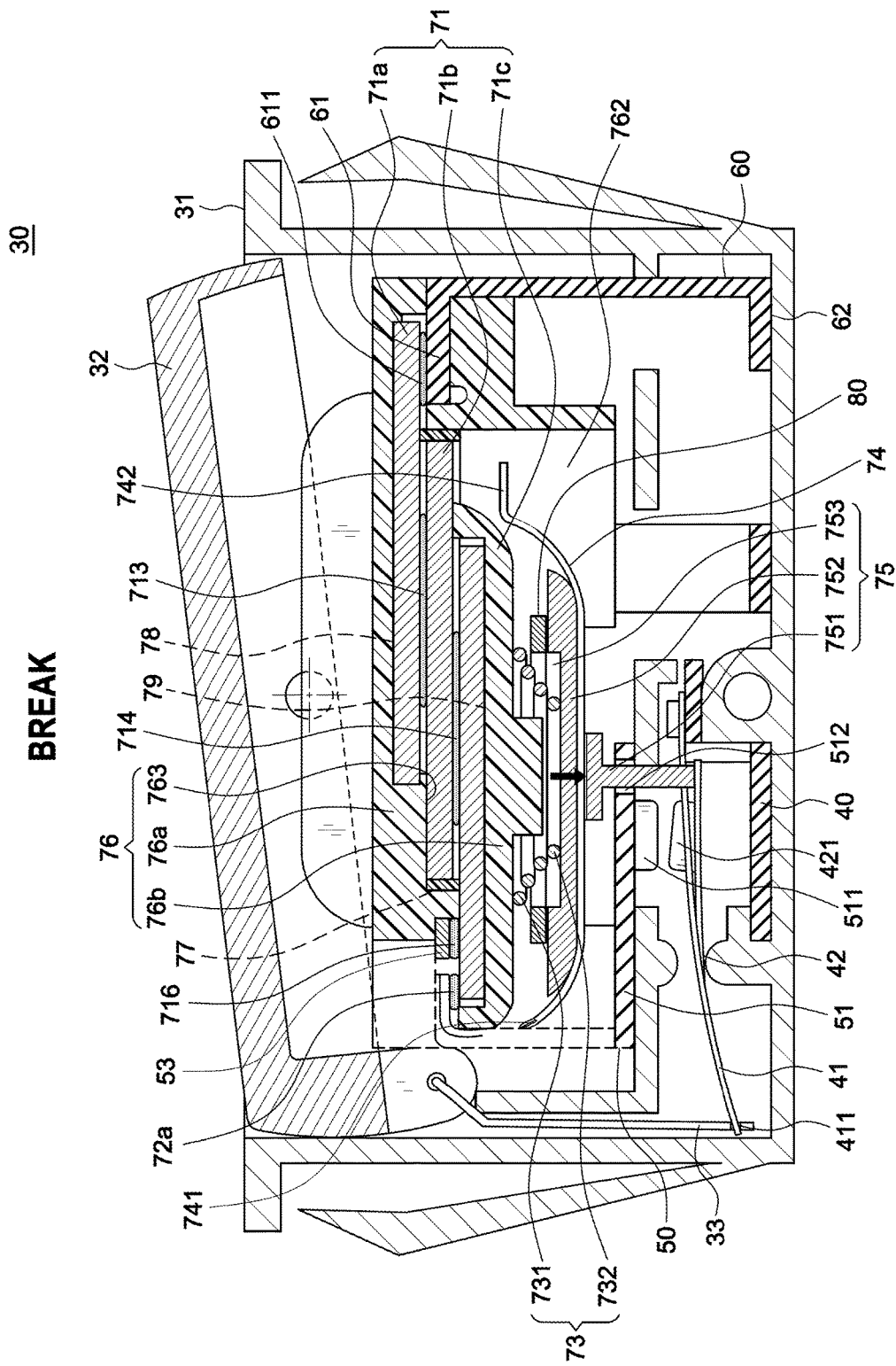
FIG. 11 is an application example of the present invention breaking a circuit thereof in a preferred embodiment.

The see-saw switch 30 is a switch disclosed by the inventor previously, including a housing 31, a press button 32 disposed on the housing 31, a first contact piece 40 arranged at a bottom of the housing 31 for input, a second contact piece 50 for output, and a third contact piece 60. The first contact piece 40 is connected to a bimetal plate 41 which has a spring piece 42 and a first contact point 421 at a middle section thereof. The second contact piece 50 has a second contact point 511 at a lower section 51 thereof to connect with the first contact point 421. A movable piece 33 has an upper end thereof engaged with a bottom of the press button 32 and a lower end thereof engaged with a free end 411 of the bimetal plate 41, so that the press button 32 is able to displace the bimetal plate 41 upwards and press the spring piece 42 downwards to connect the first and second contact points 421, 511, connecting the circuit and turning on the switch 30 as shown in FIG. 10. When overcurrent occurs, the bimetal plate 41 deforms due to the rising heat and detaches the first and second contact points 421, 511, turning the switch 30 as shown in FIG. 11. In different switches, position of the bimetal plate 41 and its engagement with the press button 32 are different. In this embodiment, the bimetal plate 41 has the spring piece 42 designed to eject in an opposite direction and the first contact point 421 is arranged on the spring piece 42.

The feature of the present invention lies in the anti-surge structure in stair-like arrangement 70 built in the switch 30 and engaged with the spring piece 42 of the bimetal plate 41. The structure includes a first metal-oxide varistor 71a, a second metal-oxide varistor 71b, a third metal-oxide varistor 71c, an insulating body 76, an insulating band 77, a spring element 73, a pushing element 75, a strap 74, and a fourth contact piece 80.

Figure 1A:
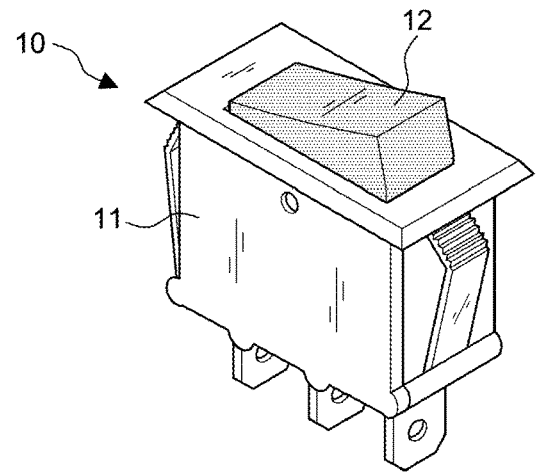
FIG. 1A is a perspective view of an overcurrent protection switch according to the prior art.
Figure 1B:
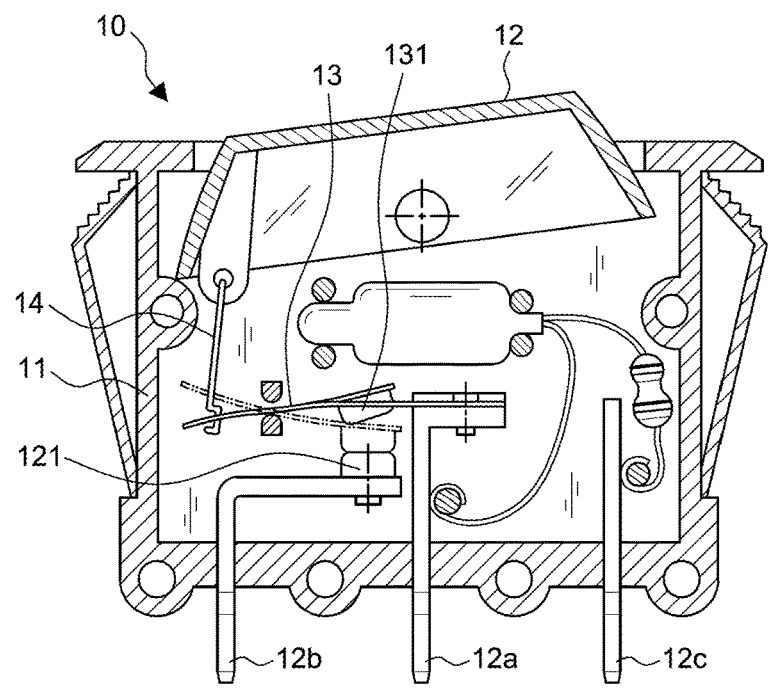
FIG. 1B is a sectional view of an overcurrent protection switch according to the prior art.
Figure 2A:
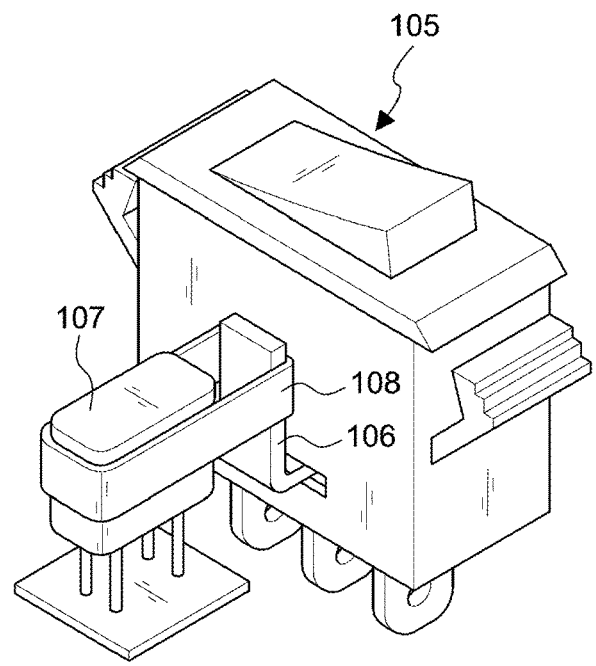
FIG. 2A is a perspective view of a switch module disclosed in U.S. Pat. No. 8,643,462.
Figure 2B:
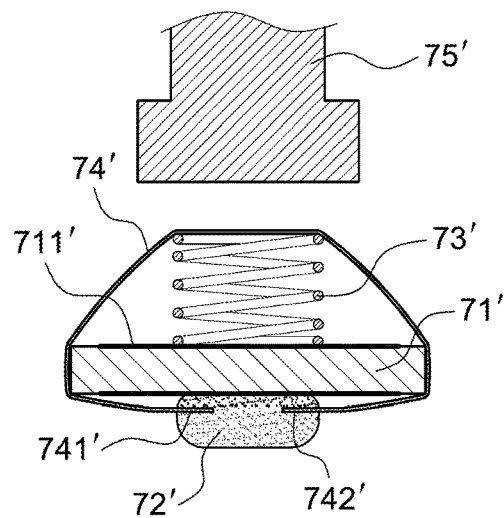
FIG. 2B is a schematic diagram of an anti-surge disconnection structure disclosed in Taiwan patent No. I511174.
Figure 3A:
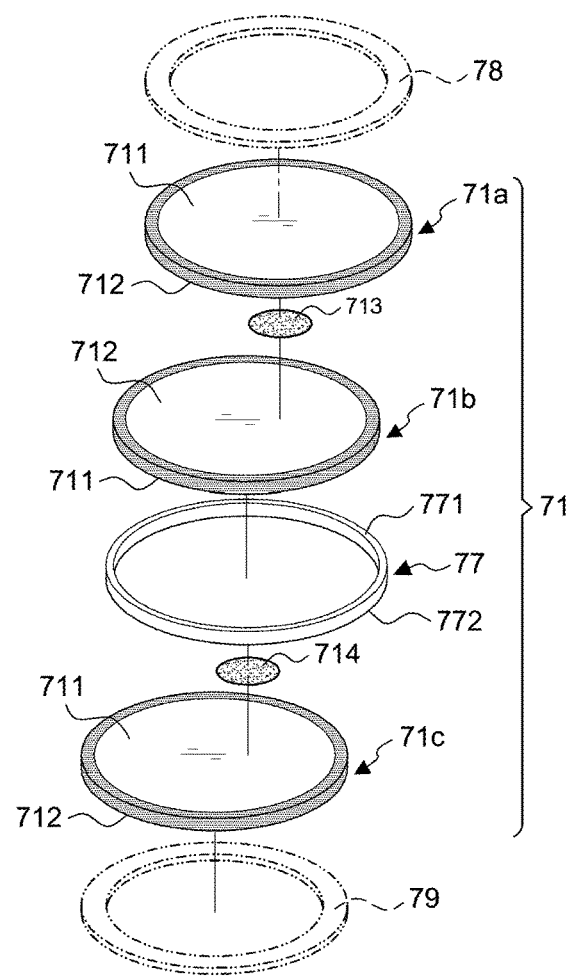
FIG. 3A is an exploded view of metal-oxide varistors assembly according to the present invention.
Figure 3B:
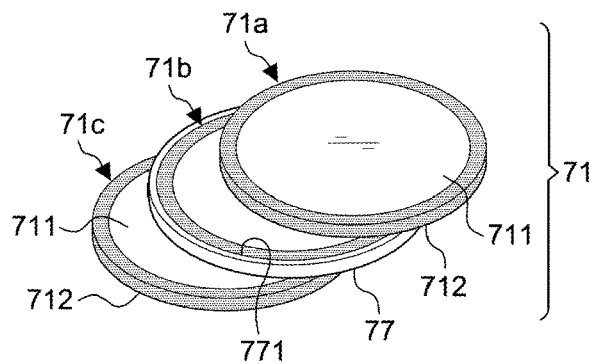
FIG. 3B is a perspective view of the metal-oxide varistors assembly according to the present invention.
Figure 3C:
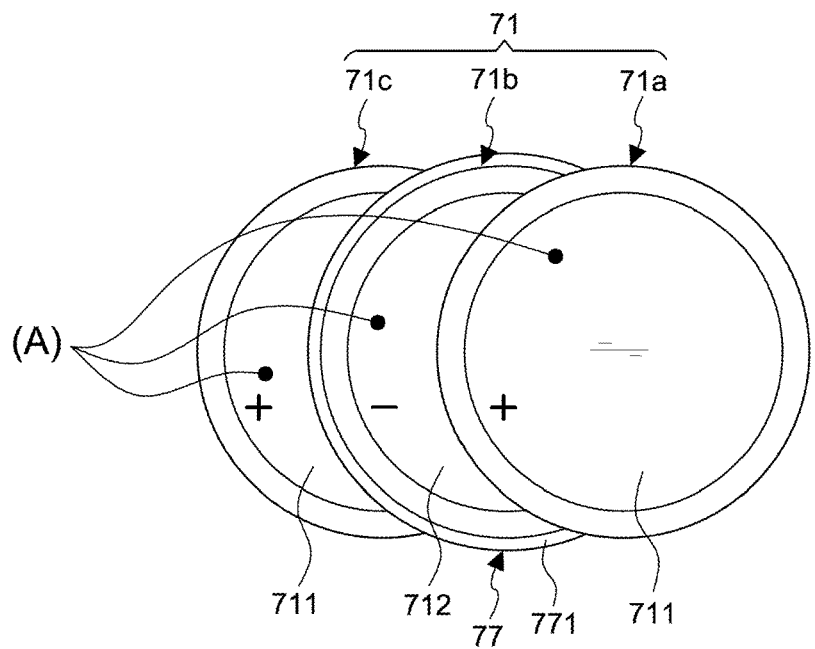
FIG. 3C is a top plan view of the metal-oxide varistors assembly.
Figure 3D:
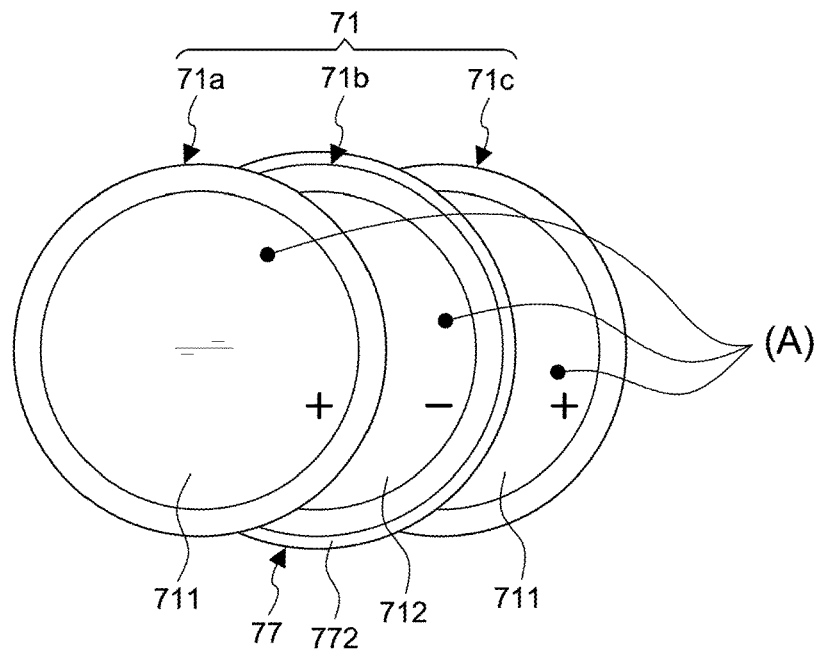
FIG. 3D is a bottom plan view of the metal-oxide varistors assembly.
Figure 3E:
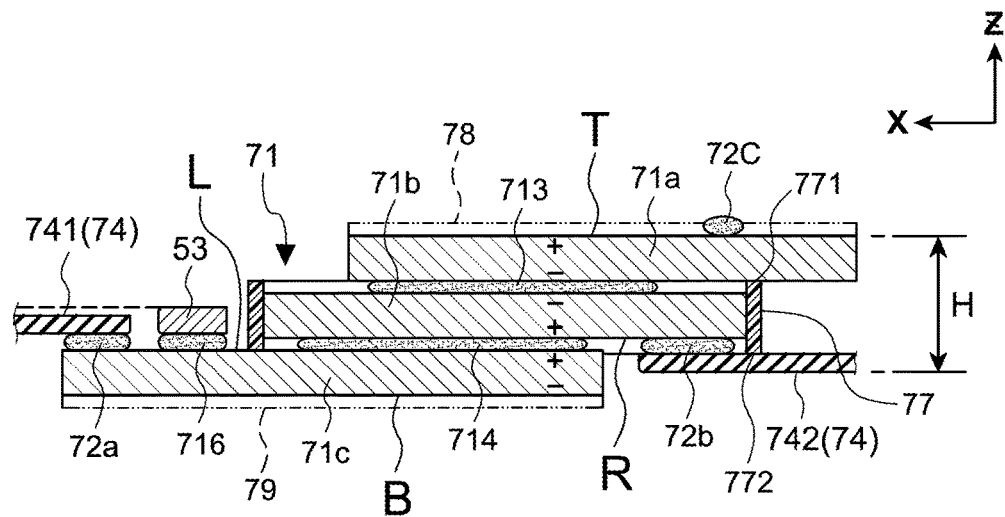
FIG. 3E is a sectional view of the metal-oxide varistors assembly.

With reference to FIGS. 3A-3E, each metal-oxide varistor has a first surface 711 at a side thereof and a second surface 712 at an opposite side thereof. The metal-oxide varistors 71a, 71b, 71c are partially overlapped in stair-like arrangement. The first surface 711 of the first metal-oxide varistor 71a and the second surface 712 of the third metal-oxide varistor 71c are completely exposed; the second surface 712 of the first metal-oxide varistor 71a is partially overlapped with the second surface 712 of the second metal-oxide varistor 71b with a first conductive element 713 disposed in-between for electrical connection, and the first surface 711 of the second metal-oxide varistor 71b is partially overlapped with the first surface 711 of the third metal-oxide varistor 71c with a second conductive element 714 disposed in-between for electrical connection. Each metal-oxide varistors 71a. 71b, 71c thereby has vertically conductive surfaces in a Z direction, and each pair of connecting surfaces of the metal-oxide varistors 71a, 71b, 71c has the same electrode for a connecting area A thereon to be connected for operation; the connecting areas A are welded by low-temperature solders. The insulating band 77 is surrounding periphery of the second metal-oxide varistor 71b and has a first surface 771 and a second surface 772. The first and second surfaces 771, 772 are respectively higher than the first and second surfaces 711, 712 of the second metal-oxide varistor 71b as illustrated in FIG. 3E.

In this embodiment, the first surface 711 of the first metal-oxide varistor 71a is the ground pole and the second surface 712 of the first metal-oxide varistor 71a is the neutral pole; the second surface 712 is further connected to the third contact piece 60 by a third conductive element 715. The first surface 711 of the second metal-oxide varistor 71b is a surface for phase line connection and the second surface 712 of the second metal-oxide varistor 71b is the neutral pole; the first surface 711 is further connected to the second contact piece 50 by a fourth conductive element 716. The first surface 711 of the third metal-oxide varistor 71c is a surface for phase line connection and the second surface 712 of the third metal-oxide varistor 71c is the ground pole; the second surface 712 is farther connected to a conductive section 84 on the fourth contact piece 80 by a fifth conductive element 717. The fourth contact piece 80 further has a free end 811 welded to the first surface 711 by a low-temperature paste 72c for electrical connection.

Figure 4:
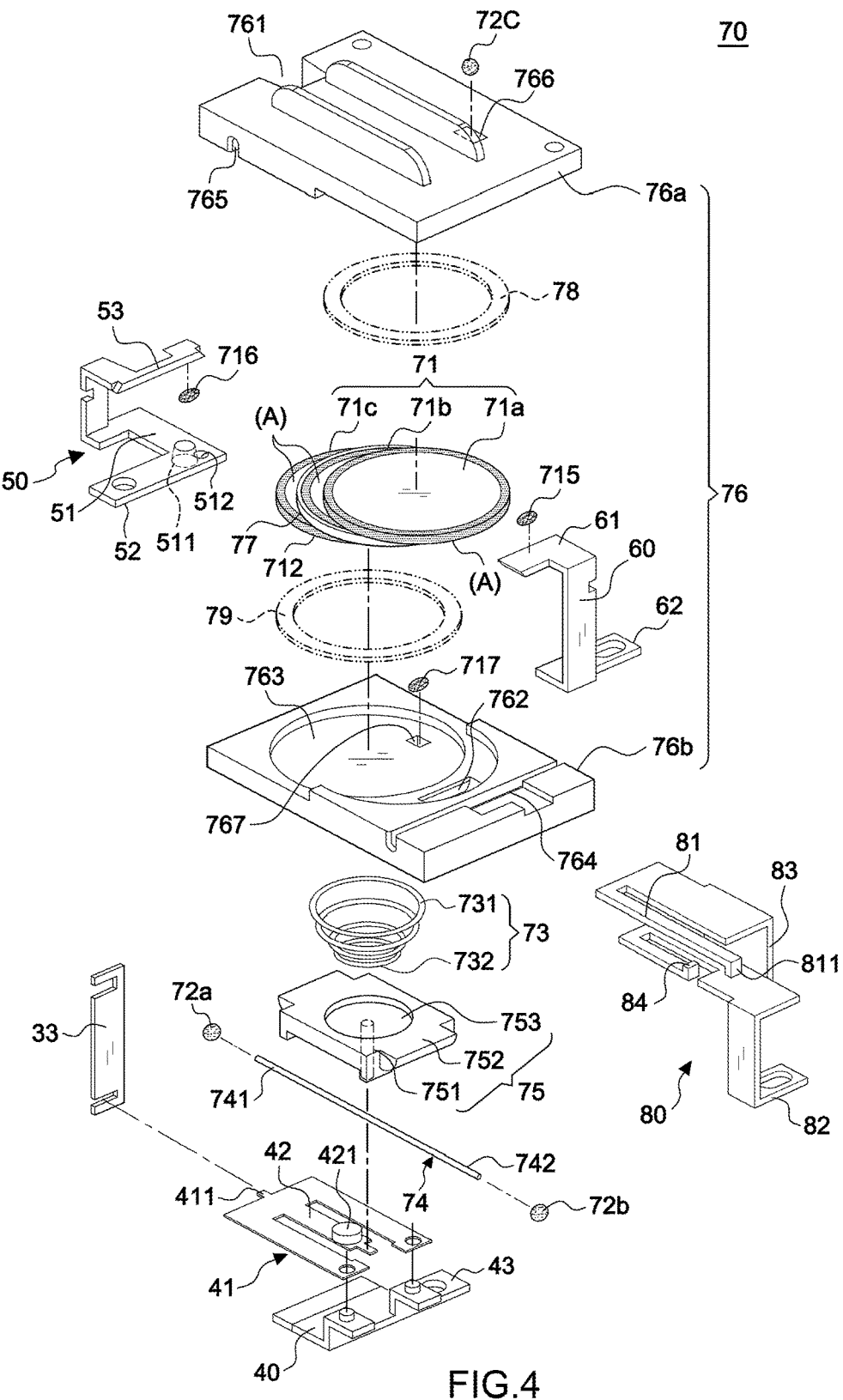
FIG. 4 is an exploded view of an anti-surge structure in stair-like arrangement according to the present invention.
Figure 5:
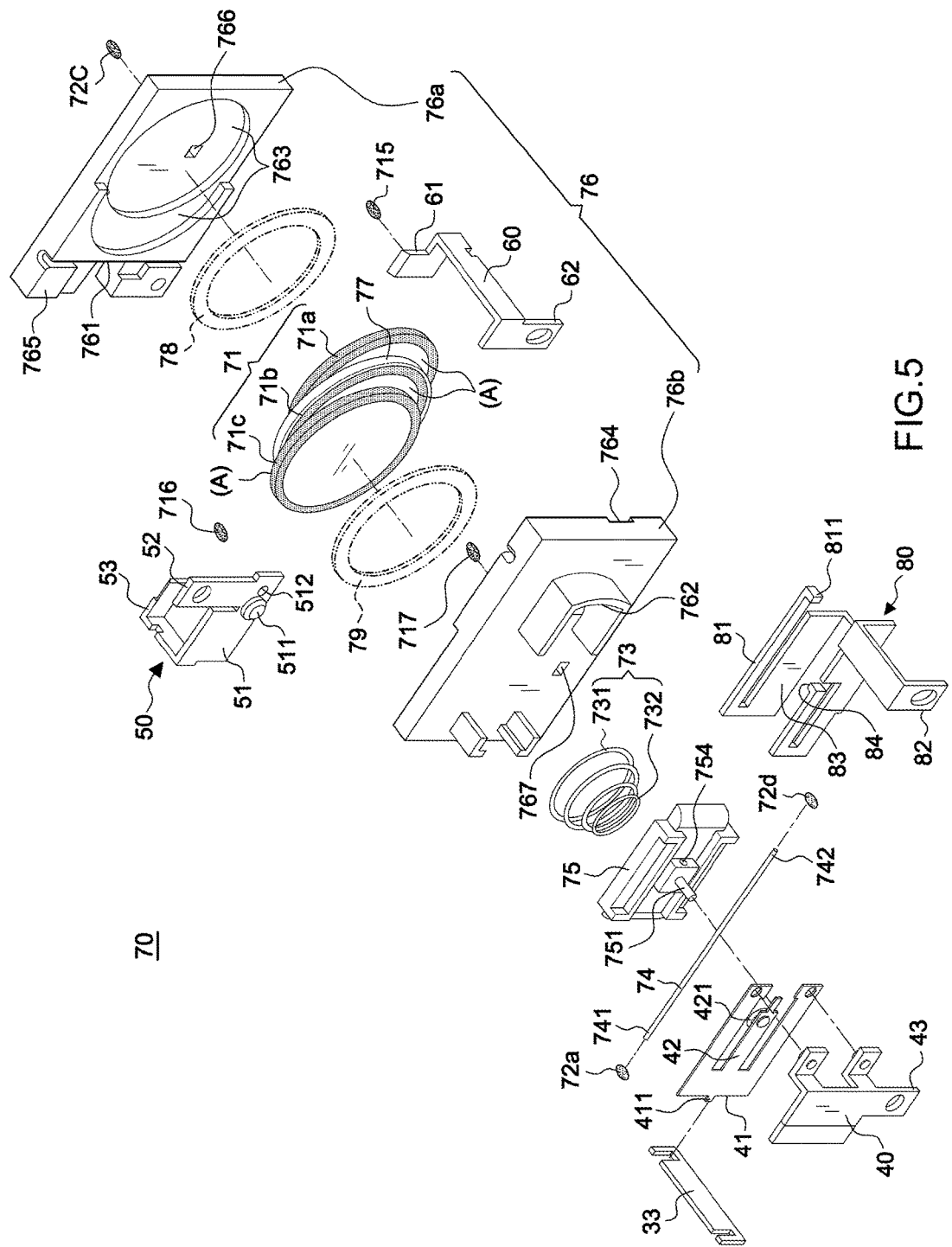
FIG. 5 is another exploded view of the anti-surge structure in stair-like arrangement according to the present invention.

The insulating body 76 is designed into a shape according to a shape of the metal-oxide varistors 71a, 71b, 71c for which to be disposed therein. With reference to FIGS. 4 and 5, in this embodiment, the insulating body 76 includes a first part 76a and a second part 76b, each having a corresponding stair-like depression for positioning the first, second, and third metal-oxide varistors 71a, 71b, 71c therein. A first insulating layer 78 is arranged between the first part 76a and the first metal-oxide varistor 71a and a second insulating layer 79 is arranged between the second part 76b and the third metal-oxide varistor 71c. With the insulating band 77 surrounding periphery of the second metal-oxide varistor 71b, the first surface 771 of the insulating band 77 is abutting on the first metal-oxide varistor 71a and the second surface 772 of the insulating band 77 is abutting on the third metal-oxide varistor 71c, defining a first insulating area T between the first metal-oxide varistor 71a and the first insulating layer 78, a second insulating area B between the third metal-oxide varistor 71c and the second insulating layer 79, a third insulating area L above the third metal-oxide varistor 71c, and a fourth insulating area. R under the second metal-oxide varistor 71b as shown in FIG. 3E.

The first part 76a of the insulating body 76 has a first open section 761 and a third open section 766 and the second part 76b of the insulating body 76 has a second open section 762 and a fourth open section 767 for externally electrical connection of the metal-oxide varistors 71a, 71b, 71c. The insulating body 76 includes positioning sections 764, 765 for further fixing of the contact pieces.

The first and second insulating layers 76a, 76b are made by printing, screen printing, or flexible elements for complete insulation. The spring element 73 is made of compressible springs and has a fixed section 731 and a springy free end 732. The pushing element 75 has a lower section abutting correspondingly on the bimetal plate 41 and an upper surface 752 compressing the spring element 73 under a bottom of the second part 76b of the insulating body 76 for the spring element 73 to be resiliently displaceable.

In this embodiment, the strap 74 is disposed under the pushing element 75 and the pushing element 75 includes a passage 754 for the strap 74 to pass therethrough. A first end 741 of the strap 74 passes through the first open section 761 and welded to a connecting area A of the first surface 711 of the third metal-oxide varistor 71c by a first low-temperature solder paste 72a, and a second end 721 of the strap 74 passes through the second open section 762 and welded to a connecting area A of the first surface 711 of the second metal-oxide varistor 71b, so as to fix a position of the pushing element 75 under the second part 76b of the insulating body 76. The low-temperature solder paste is metal alloy and has different melting point according to proportion of the alloy mixture. Therefore, the melting point can be pre-determined to coordinate with the metal-oxide varistors. The conductive elements can also use the same material for operation.

Figure 7:
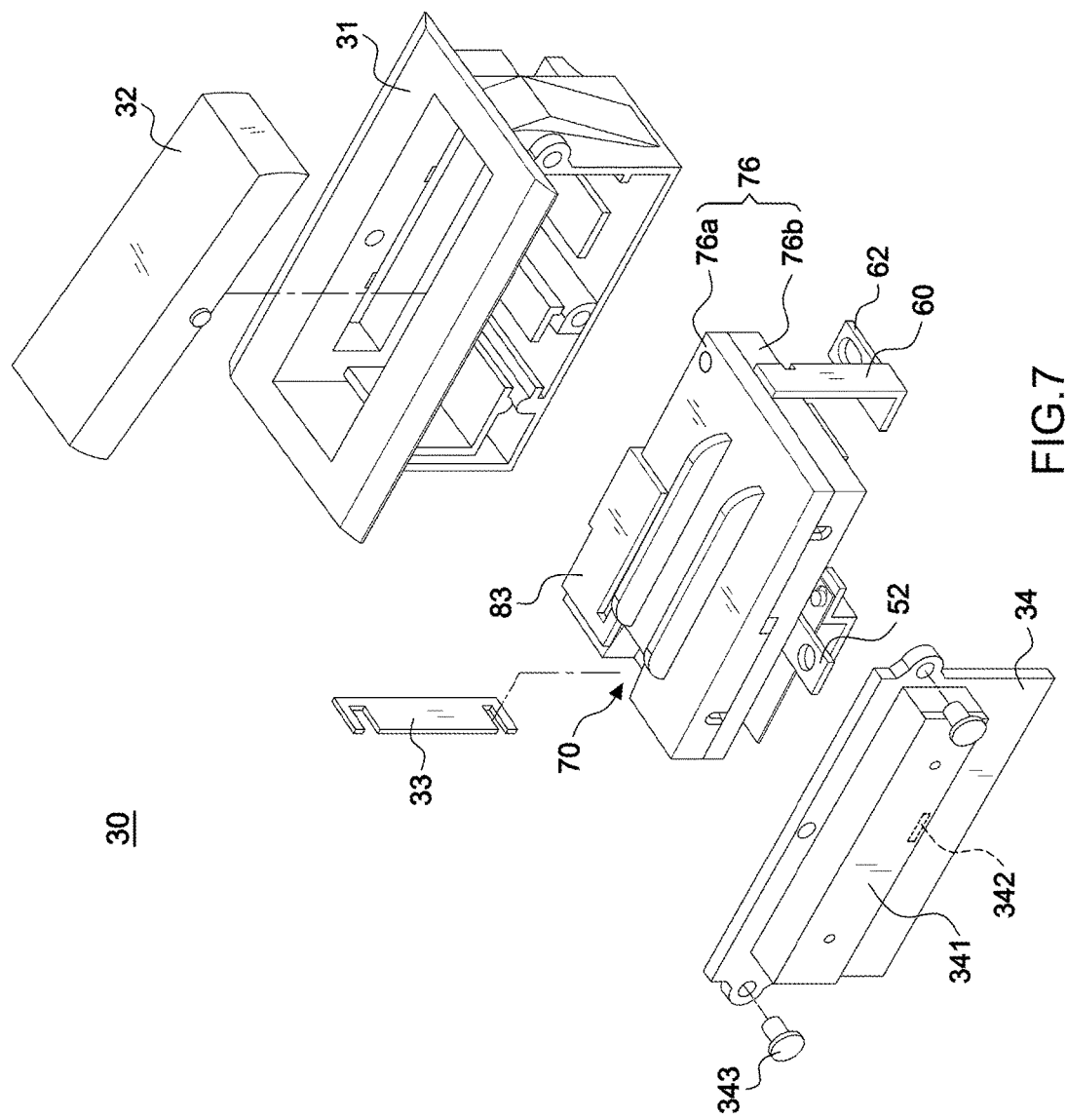
FIG. 7 is an exploded view of the present invention in a preferred embodiment.

Referring to FIGS. 7 and 8, a cover 34 is further fixed at a front side of the housing 31 by a fixing element 343. The cover 34 has a first chamber 341 protruding frontwards with an opening 342 at a lower part of the first chamber, and a second chamber 311 protruding rearwards relative to the first chamber 341. The anti-surge structure is thereby disposed and placed within the housing 31 and the chambers 341, 342.

Figure 3F:
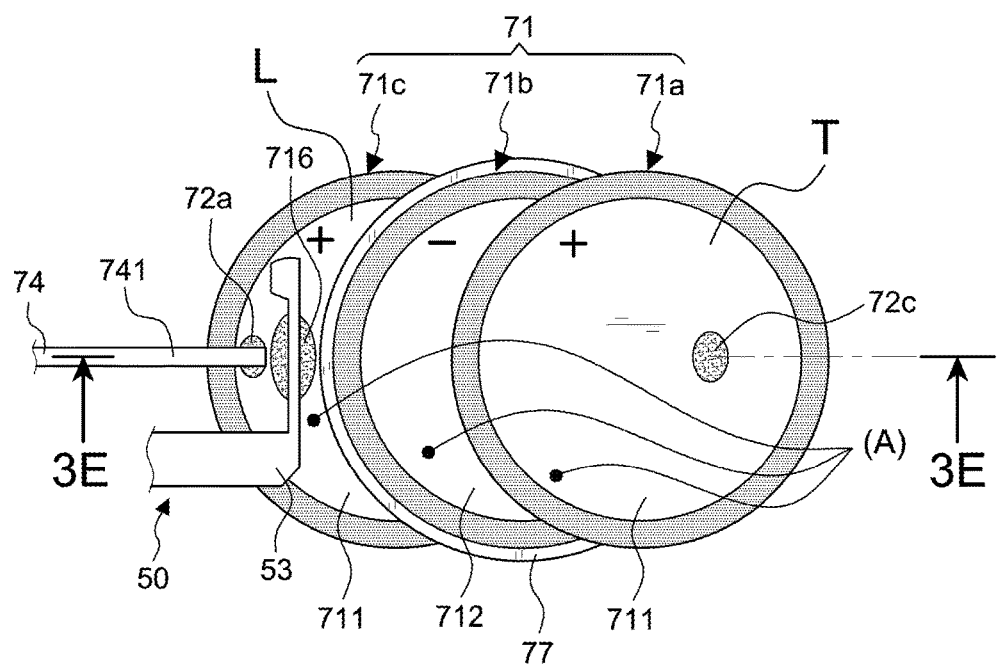
FIG. 3F is a top plan view showing connecting areas of the metal-oxide varistors assembly.
Figure 8A:
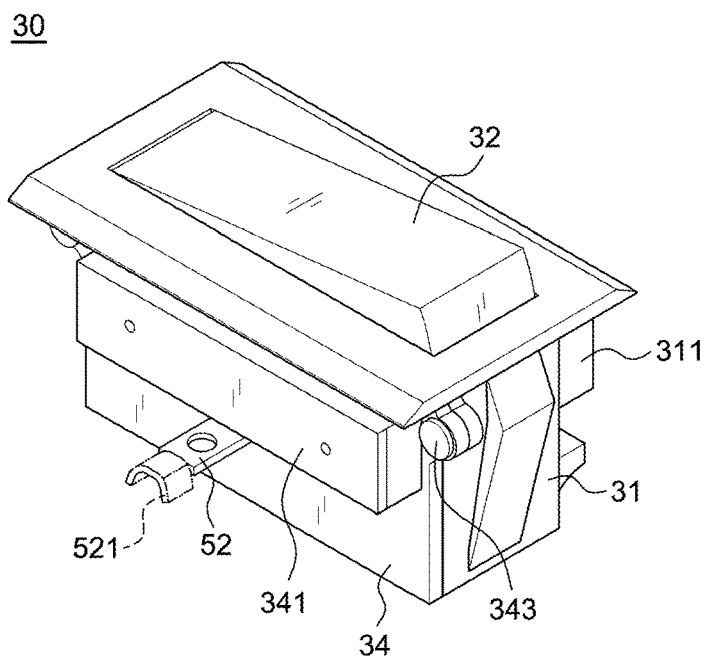
FIG. 8A is a perspective view of the present invention in a preferred embodiment.
Figure 8B:
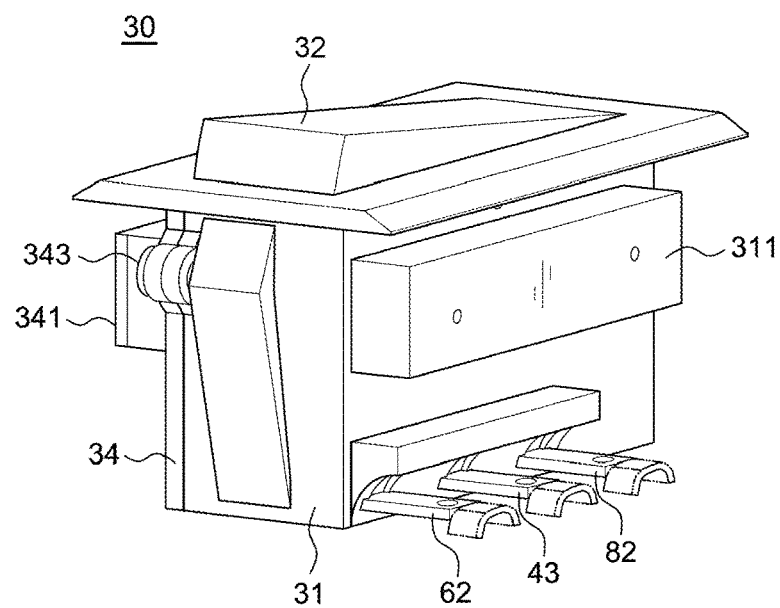
FIG. 8B is another perspective view of the present invention in a preferred embodiment.
Figure 9:
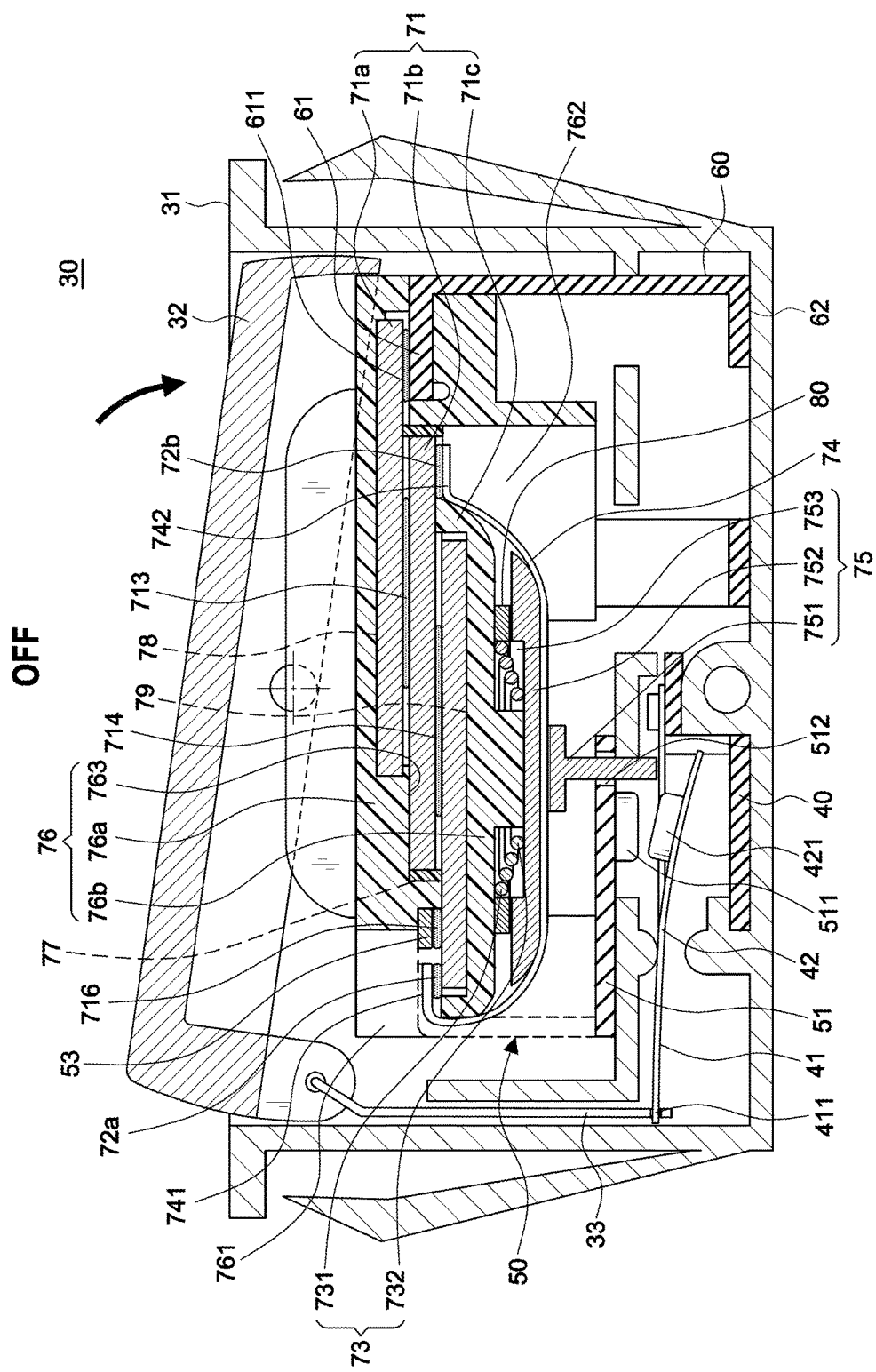
FIG. 9 is a sectional view of the present invention in an OFF state in a preferred embodiment.

The first contact piece 40 further includes an extended section 43 stretching out a rear of the housing 31 as shown in FIG. 8B. The second contact piece 50 further includes an extended section 52 stretching out the opening 342 of the cover 34 as shown in FIG. 8A, and an upper section 53 electrically connected to the first surface 711 of the third metal-oxide varistor 71c by a fourth conductive element 716 as shown in FIGS. 3F, 4, and 9. The third contact piece 60 includes an upper section 61 electrically connected to the second surface 712 of the first metal-oxide varistor 71a by a third conductive element 715 and an extended section 62 stretching out the rear of the housing 31 as shown in FIG. 8B. The extended section 52 can be arranged in a U shape 521 for electrical connection and other extended sections 43, 62 can be arranged in a U shape or in any other forms for electrical connection but is not limited to such application.

Figure 6A:
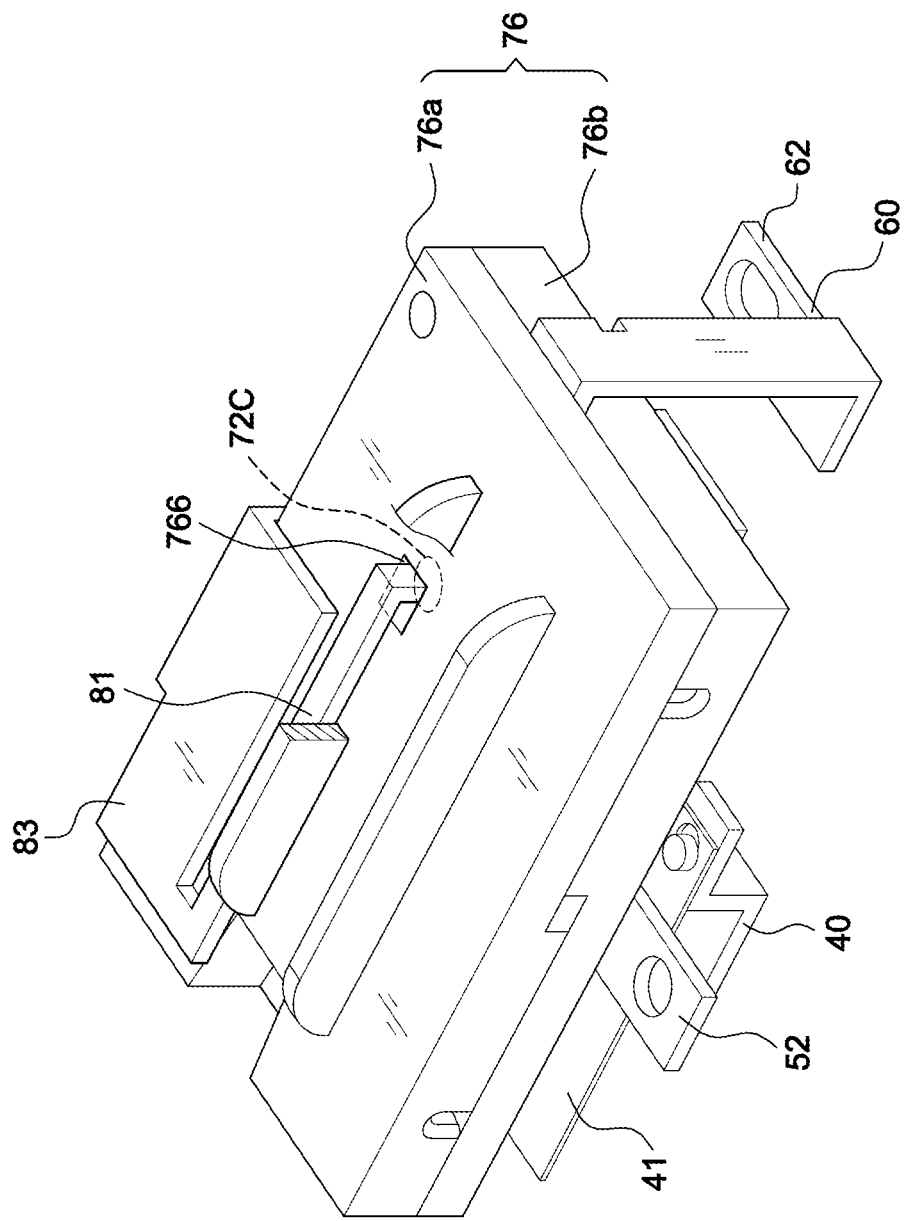
FIG. 6A is a perspective view of an assembled anti-surge structure according to the present invention.
Figure 6B:
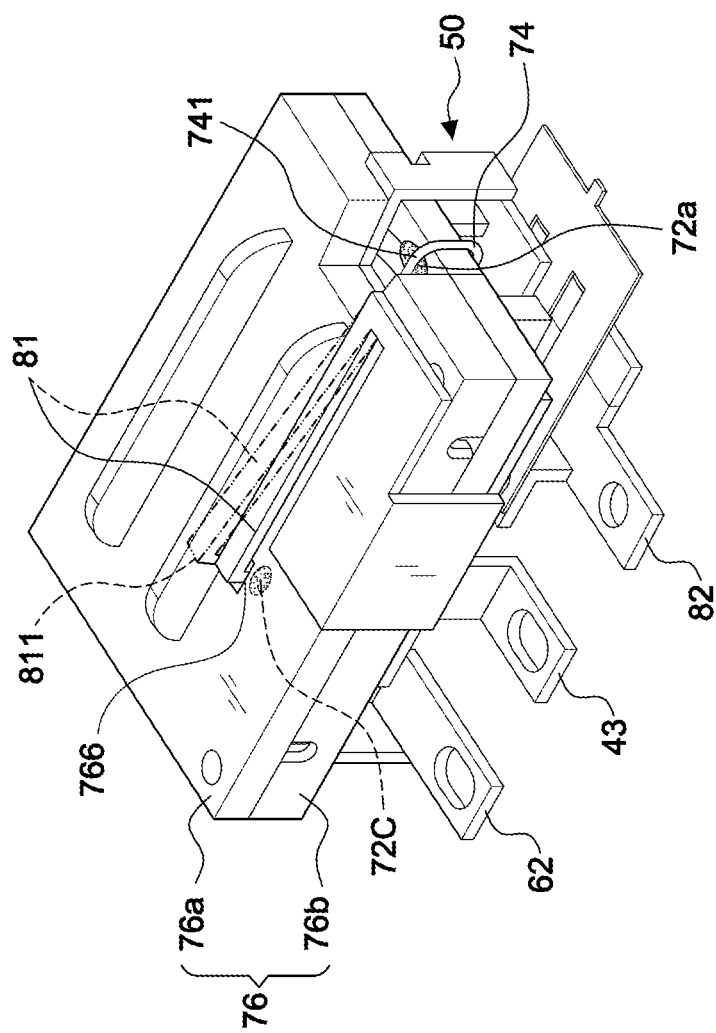
FIG. 6B is another perspective view of the assembled anti-surge structure according to the present invention.

The fourth contact piece 80 engages with the insulating body 76 with a fixing section 83 at an upper part thereof enhancing the engagement and an extended section 82 at a lower part thereof extending through the rear of the housing 31. The fourth contact piece 80 further has an elastic section 81 at a top thereof. The elastic section 81 includes a free end 811 passing through the third open section 766 of the first part 76a of the insulating body 76 and being welded on the first surface 711 of the first metal-oxide varistor 71a by a third low-temperature solder paste 72c. When the first metal-oxide varistor 71a is overheated and melts down the third low-temperature solder paste 72c, the free end 811 of the elastic section 81 is ejected upwards to break the circuit as shown in FIG. 6B. Besides, the fourth contact piece 80 has a conductive section 84 arranged below the free end 811. The conductive section 84 is extending through a fourth open section 767 on the second part 76b of the insulating body 76 and is connected to the second surface 712 of the third metal-oxide varistor 71c by a fifth conductive element 717.

The pushing element 75 is a separate component and has the lower section arranged as a rod section 751 for abutting on the bimetal plate 41 and the upper surface 752 arranged in a shape corresponding to a shape of the second part 76b of the insulating body 76; the upper surface 752 further includes a positioning space 753 for the free end 732 of the spring element 73 to be fixed therein. Thereby the first and second contact points 421, 511 would be detached when the spring element 73 ejects. In the embodiment, the second contact piece 50 further includes a through hole 512 near the second contact point 511 of the second contact piece 50 for the rod section 751 to stretch through.

FIG. 9 illustrates the switch 30 in an OFF state in a preferred embodiment of the present invention, where the first and the second contact points 421, 511 are detached. FIG. 10 illustrates the switch 30 in an ON state in the preferred embodiment, where the first and second contact points 421, 511 are connected by the operation of the press button 32 that displaces the bimetal plate 41 upwards and forces the spring piece 42 downwards. When overcurrent or overvoltage occurs to the switch 30 in an ON state, temperature of the second or third metal-oxide varistors 71b, 71c rises up to a degree higher than a melting point of the low-temperature solder pastes, forcing the first or second low-temperature solder paste 72a, 72b to melt down and loosen the strap 74, ejecting the free end 732 of the spring element 73 and displacing the pushing element 75, thereby the first contact point 421 on the bimetal plate 41 is detached from the second contact point 511 and the circuit of the switch 30 is broken as illustrated in FIG. 11; or the first metal-oxide varistor 71a is overheated and melts down the third low-temperature solder paste 72c, ejecting the free end 811 of the elastic section 81 and breaking the circuit of the switch 30 as shown in FIG. 6B.

In short, the present invention has functions and features stated as following.

1. The stair-like arrangement of the metal-oxide varistors 71a, 71b, 71c allows each varistor to have a connecting area A for electrical connections as shown in FIGS. 3C-3F. And the connecting areas A allow easier connection to the contact pieces without taking much space. Furthermore, the strap 74 is arranged in a vertical direction Z for faster operation and the strap 74 can be made of metal component that is the same material in the low-temperature solder pastes. Thereby the present invention has simple structure with shorter height than structures in the prior art.

2. The insulating band 77 divides the space around the structure into four isolated insulating areas in order to prevent from flashover, and the strap 74 has the first and seconds 741, 742 fixed by the low-temperature solder pastes 72a, 72b for operation of breaking the circuit.

3. The present invention has the structure shorter in height and the pushing element 75 to be operated faster, in case of blasts of the metal-oxide varistors due to slow detaching operation of the pushing element 75. The melting point of the first and second low-temperature solder pastes 72a, 72b are no higher than 130° C., so as to ensure the operation is completed within a short period.

What is claimed is:

1. An anti-surge structure built in switches, comprising:
a housing;
a first metal-oxide varistor, a second metal-oxide varistor, a third metal-oxide varistor, each having a first surface at a side thereof and a second surface at an opposite side thereof, said metal-oxide varistors partially overlapped in stair-like arrangement, the first surface of the first metal-oxide varistor and the second surface of the third metal-oxide varistor being left completely exposed, the second surface of the first metal-oxide varistor partially overlapped with the second surface of the second metal-oxide varistor with a first conductive element disposed in-between for electrical connection, the first surface of the second metal-oxide varistor partially overlapped with the first surface of the third metal-oxide varistor with a second conductive element disposed in-between for electrical connection;
an insulating body including a first part and a second part assembled for the metal-oxide varistors to be disposed therein, the first part having a first open section and a third open section and the second part having a second open section and a fourth open section for externally electrical connection of the metal-oxide varistors;
an insulating band surrounding a periphery of the second metal-oxide varistor and having a thickness greater than a thickness of the second metal-oxide varistor to fill in spaces between the stair-like metal-oxide varistors and the insulating body, protecting the metal-oxide varistors from external impacts and defining four isolated insulating areas around the metal-oxide varistors;
a spring element having a fixed section and a springy free end;
a pushing element having a lower section abutting correspondingly on a bimetal plate and an upper surface compressing the spring element under a bottom of the second part of the insulating body for the spring element to be resiliently displaceable;
a strap disposed under the pushing element and having a first end passing through the first open section and welded to a connecting area of the first surface of the third metal-oxide varistor by low-temperature solder paste, and a second end passing through the second open section and welded to a connecting area of the first surface of the second metal-oxide varistor, so as to fix a position of the pushing element under the second part of the insulating body;

a fourth contact piece having an elastic section at a top thereof, the elastic section including a free end passing through the third open section of the first part of the insulating body and being welded on the first surface of the first metal-oxide varistor by low-temperature solder paste;

whereby when an overvoltage occurs, temperature of the second and third metal-oxide varistors rises up instantly to a degree that is higher than a melting point of the low-temperature solder pastes, loosening the strap, releasing the free end of the spring element to displace the pushing element and thereby breaking a electrical circuit thereof; or when an overvoltage occurs, temperature of the first metal-oxide varistor rises up instantly to a degree that is higher than a melting point of the low-temperature solder pastes, releasing the elastic section and thereby breaking a electrical circuit thereof.

2. The anti-surge structure built in switches as claimed in claim 1, wherein the housing has a push button on a top thereof, a first contact piece engaged with the bimetal plate, a second contact piece having a second contact point on a bottom surface thereof detachably contacting a first contact point on the bimetal plate, a third contact piece, and a movable piece having an end thereof engaged with an end of the push button and another end thereof engaged with the bimetal plate, thereby the bimetal plate being deformed due to rising temperature caused by overcurrent and detaching the first contact point from the second contact point for overcurrent protection.

3. The anti-surge structure built in switches as claimed in claim 2, wherein the first and second parts of the insulating body each has a corresponding stair-like depression for positioning the first, second, and third metal-oxide varistors therein.

4. The anti-surge structure built in switches as claimed in claim 2, wherein the pushing element is a separate component and has the lower section arranged as a rod section for abutting on the bimetal plate and the upper surface arranged in a shape corresponding to a shape of the second part of the insulating body, the upper surface further including a positioning space for the free end of the spring element to be fixed therein.

5. The anti-surge structure built in switches as claimed in claim 4, wherein the pushing element has a passage for the strap to pass through.

6. The anti-surge structure built in switches as claimed in claim 5, further comprising a cover arranged at a front side of the housing, said cover has a first chamber protruding frontwards with an opening at a lower part of the first chamber, and a second chamber protruding rearwards relative to the first chamber.

7. The anti-surge structure built in switches as claimed in claim 6, wherein the second contact piece further includes a through hole arranged near the second contact point for the rod section of the pushing element to pass through and an extended section extending through the opening of the cover, and an upper section of the second contact piece is electrically connected to the first surface of the third metal-oxide varistor.

8. The anti-surge structure built in switches as claimed in claim 2, wherein the third contact piece has an upper section electrically connected to the second surface of the first metal-oxide varistor by a third conductive element and a lower section including an extended section extending through a rear side of the housing.

9. The anti-surge structure built in switches as claimed in claim 2, wherein the fourth contact piece has a conductive section arranged below the free end, said conductive section extending through a fourth open section on the second part of the insulating body and being connected to the second surface of the third metal-oxide varistor by a fifth conductive element, and the fourth contact piece engages with the insulating body with a fixing section at an upper part thereof enhancing the engagement and an extended section at a lower part thereof extending through the rear of the housing.

10. The anti-surge structure built in switches as claimed in claim 2, further comprising a first insulating layer arranged between the first part of the insulating body and the first metal-oxide varistor and a second insulating layer arranged between the second part of the insulating body and the third metal-oxide varistor, said first and second insulating layers made by printing, screen printing, or flexible elements.

* * * * *